April 27, 1965     P. J. A. MARCHAL ETAL     3,181,169
APPARATUS FOR RECORDING THE TRAJECTORIES OF MOVING
BODIES AND AERIAL MISSILES ON MOTION PICTURE FILM
Filed June 26, 1962 ously controls synchronization of the cameras 2 and triggering of the control transmitter 6 the flash triggering
United States Patent Office 3,181,169
Patented Apr. 27, 1965

3,181,169
APPARATUS FOR RECORDING THE TRAJECTORIES OF MOVING BODIES AND AERIAL MISSILES ON MOTION PICTURE FILM
Pierre Joseph Anatole Marchal, Pegomas, and Raymond Charles Galinaro, Sceaux, France, assignors to Sud-Aviation Societe Nationale de Constructions Aeronautiques, Paris, Seine, France
Filed June 26, 1962, Ser. No. 205,339
Claims priority, application France, June 29, 1961, 866,395, Patent 1,304,040
10 Claims. (Cl. 346—107)

This invention relates to improvements in apparatus for recording the trajectories of moving bodies by photographic means.

Film recordings have already been made of the trajectories of moving bodies and in particular of self-propelled aerial missiles, be they remote-controlled or not, by receiving on cine-theodolites the luminous flashes emitted by discharge lamps or resulting from the successive ignition of flares carried by the missile, said flashes being ground-controlled by an electronic remote control unit which operates concurrently with opening of the lens shutters. For this type of recording, synchronization between the lenses and the luminous flashes is an absolute necessity, which synchronization has never been obtained up to this time.

This is because the multiplicity of cameras, the operating conditions of each shutter and the individual responses thereof to given conditions such as low temperatures, or the individual conditions of lubrication and their influence on friction, and, furthermore, the impossibility with each individual shutter of ensuring the constancy through time of the point of maximum aperture, together constitute a major obstacle for such synchronization, obstacle to which must be added the delay in the reception of the return signals after transmission of the ignition command signal.

This in turn calls for a lens aperture time greater than the duration of the luminous flash to enable the latter to be framed with certainty, which means that the film may be exposed for a time as much as ten times the duration of the flash. Whereas such a difference is permissible when filming by night, when the ambient brightness is low in relation to that of the flash, this is no longer so in the daytime. The strong surrounding brightness in this case makes it necessary to diaphragm down, which entails an ipso facto reduction of the recordable range of the missile.

In order to overcome these various drawbacks, the present invention has for its object to provide an apparatus for recording, by means of multiple motion picture cameras, the trajectories of moving bodies that emit signals that sensitize photographic emulsions, said apparatus, for each camera causing exposure of said emulsion to be triggered by the reception of said signal at the observation point, and limiting said exposure to the duration of said signal.

The invention further has for its object to provide an apparatus of the character described wherein opening of the shutter of each motion picture camera is controlled by a photoelectric cell which receives a luminous signal emitted directly or indirectly by the moving body, said cell being connected to the shutter operating device through a filter which discriminates between the ambient light and the pulsed light produced by the flash and which is associated to an amplifier.

In a preferred embodiment, in the specific case where the luminous flash is emitted indirectly by the missile by means of a discharge lamp triggered by the camera synchronizing unit, the conventional mechanical shutter is replaced by an electronic image converter operating as an electronic shutter the cathode of which is excited by the photoelectric cell.

Shutter inertia being thereby eliminated and exposure time being that of the flash, the ratio of ambient brightness to flash brightness is minimum, which in turn permits full lens apertures and consequent recordings at maximum possible range.

In the case of flashes having a longer emission time; as in the case of flashes obtained with flares, the conventional mechanical shutter may be retained.

The description which follows with reference to the accompanying drawings, which are given by way of example only and not of limitation, will give a clear understanding of how the invention may be carried into practice.

Figure 1:
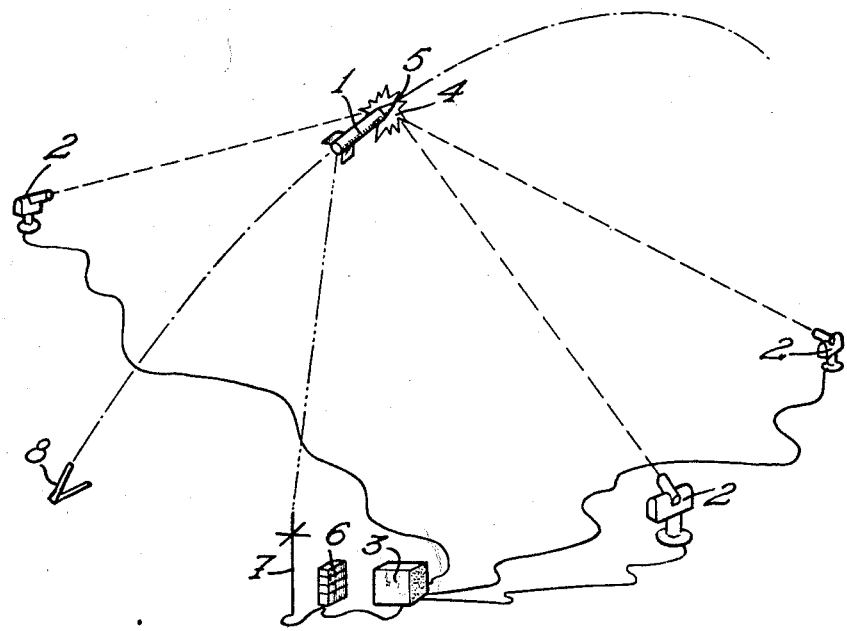
FIG. 1 is a schematic illustration of the method of installing the recording equipment on the ground, showing the relative position of the missile whose trajectory is to be recorded.

Referring first to FIG. 1, the apparatus for recording the trajectory of a missile 1 through multiple motion picture channels comprises three cine-theodolites 2 which are optically sighted onto the missile by the ground personnel. A synchronizing unit 3 synchronizes operation of the cameras in cine-theodolites 2 and triggers the flash 4 from a discharge lamp 5 mounted in the missile, through the medium of a remote control transmitter 6 and its antenna 7. The missile 1, which is launched from a ramp 8, comprises a conventional remote control receiver.

Figure 2:
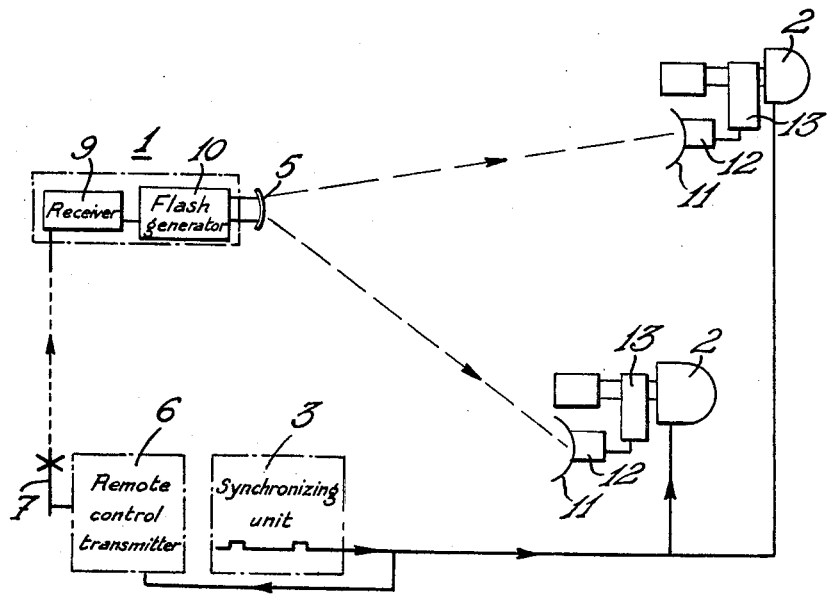
FIG. 2 is a block diagram showing the electrical, electronic and optical connections between the various units in the installation.

As shown in FIG. 2, synchronizing unit 3 simultaneously controls synchronization of the cameras 2 and triggering of the control transmitter 6 the flash triggering pulses from which are electronically transmitted by the antenna 7 to the receiver 9 on the missile 1, which receiver is electrically linked to the flash generator 10 supplying the lamp 5. Each recording camera 2 receives the ensuing light rays on the convergent mirror 11 of a photoelecrtic cell type flash detector 12 the cell of which energizes a device 13 which opens the shutter of camera 2.

Figure 3:
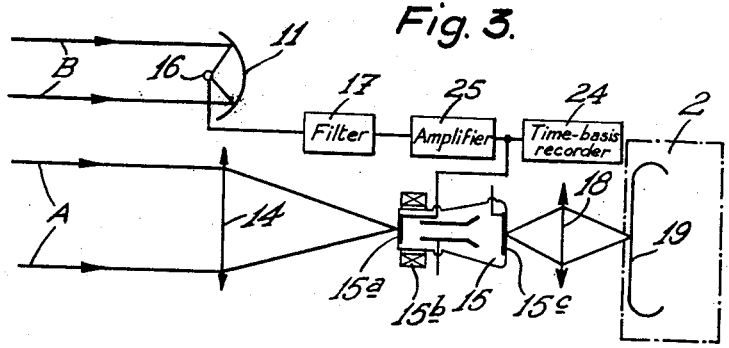
FIGS. 3 to 5 illustrate a conventional cine-theodolite converted in accordance with three different embodiments of the invention.

In the embodiment shown in FIG. 3, the normal optical beam of light A received from the missile lamp 5 passes through a lens 14 which converges it onto the photo-cathode 15a of an image converter 15 of any known type. In addition to its photo-cathode which is sensitive to the light radiation to be detected, said image converter comprises an electron optics system 15b which forms the electronic image of said photo-cathode on a fluorescent screen 15c, which screen is raised to a high potential relative to said photo-cathode and, when excited by the incident electrons, reconstitutes a converted image of the luminous flash in visible light.

A secondary parallel beam B is received by convergent mirror 11 of the flash detector rigid with the theodolite, and said beam B converges onto a photoelectric cell 16 positioned at the focal point of said mirror. The current emitted by said photoelectric cell energizes the photo-cathode 15a of image converter 15 after it has passed through a filter 17 adapted to discriminate between the ambient light and the pulsed light from the flash. Filter 17 is connected to photo-cathode 15a by an amplifier 25, in such manner that said image converter operates both as an electron multiplier and as an electric lens which, during the period it is rendered operative by the current issuing from said amplifier, gives a brighter image on its rear face of the image received on its front face.

The image converter 15 thus operates as a shutter, and the brighter image obtained on its fluorescent screen 15c, after passing through a convergent lens 18, is recorded on the film 19 of the camera 2.

Figure 4:
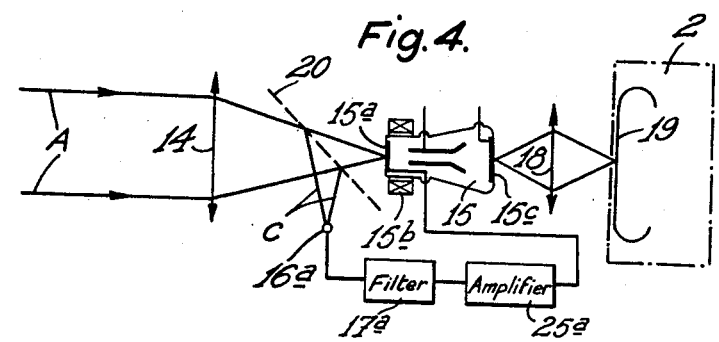

In the embodiment illustrated schematically in FIG. 4, the main beam A from the source of light, after it has passed through convergent lens 14, is split in two by a semitransparent mirror 20 set at an angle of 45° to the axis of said beam and positioned between lens 14 and image converter 15. The secondary deflected beam C converges upon a photoelectric cell 16a which excites the photo-cathode 15a of image converter 15 after it has passed through filter 17a to the amplifier 25a. As in the previous case, the brighter image obtained on the fluorescent screen 15c of image converter 15 passes through lens 18 and is then recorded on the film 19 of camera 2.

Figure 5:
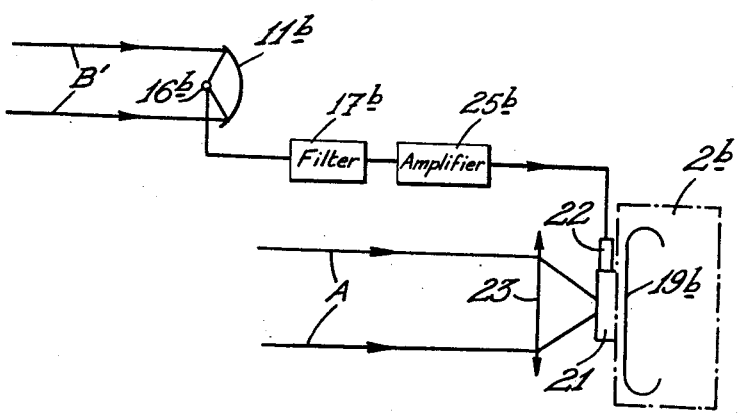

When the source of luminous flashes consists of flares having light emission times which are longer than the discharge times of the lamps referred to in the preceding examples, this extension of the emission period will permit the use of a mechanical shutter 21, as shown in FIG. 5. The shutter operating device 22 is actuated by the flash emitted by the missile, through the instrumentality of photoelectric cell 16b which receives the beam of light B' from said flash via the convergent mirror 11b and which energizes a filter 17b connected to the device 22 by an amplifier 25b. When the shutter is opened by photoelectric cell 16b, the main light beam A received through convergent lens 23 prints the film 19b of camera 2b.

By an appropriate choice of the nature of the sensitive coatings on the photo-cathode 15c and the photoelectric cell 16, 16a or 16b, it is possible to record signals emitted on wavelengths situated within the visible light spectrum or on either side of said spectrum, such as ultra-violet light or infra-red light, and, particularly in the latter case, this can be achieved by using the exhaust jet from the propulsion units. It is similarly possible to so choose the coating substances as to permit recordings of signals of a given color. Such substances are well known to the specialist in the art, a few specific examples being coatings made of silver caesium-oxide for near-infra-red and coatings made of caesium-antimony for visible light.

The signal emitted by photoelectric cell 16, 16a or 16b can be recorded on the ground on a time-basis recorder as shown by way of example at 24 in FIG. 3, thereby providing an accurate history of the missile trajectory.

The method and apparatus according to this invention offer the following advantages:

(a) The opening of the shutter is controlled by the flash itself.

(b) The film exposure time is equal to the duration of the flash.

(c) The ratio of the ambient brightness to the flash brightness is minimum.

(d) The recordable missile range is maximum.

(e) An accurate history of the trajectory can be obtained.

What we claim is:

1. Apparatus for recording the trajectories of moving bodies and aerial missiles emitting pulsed signals that sensitize photographic emulsions, said apparatus being of the type having a plurality of running motion picture cameras and comprising, in combination, means for simultaneously synchronizing the cameras and remotely controlling the emission of the pulsed signals, and for each motion picture camera, a shutter having an actuating device, and a means sensitive to the light of the pulsed luminous beam issuing from the moving body for controlling said actuating device at the beginning of each pulsed signal and for limiting the corresponding exposure of the emulsion to the duration of said signal.

2. Apparatus for recording the trajectories of moving bodies and aerial missiles emitting pulsed signals that sensitize photographic emulsions, said apparatus being of the type having a plurality of running motion picture cameras and comprising, in combination, means for simultaneously synchronizing the cameras and remotely controlling the emission of the pulsed signals, and for each motion picture camera, a shutter having an actuating device, a photoelectric cell receiving the pulsed luminous beam from the moving body, a filter which discriminates between the ambient light and the light of said luminous beam and which is connected to said cells, and an amplifier connecting said filter to said actuating device to control the latter at the beginning of each pulsed signal and to limit the corresponding exposure of the emulsion to the duration of said signal.

3. An apparatus as claimed in claim 2, wherein the shutter consists of an electronic image converter acting as an electronic shutter and having a fluorescent screen directed toward the motion picture camera and a photo-cathode directed toward the moving body and connected to the amplifier so as to be energized by the photoelectric cell, and a convergent lens interposed between said fluorescent screen and the motion picture camera, whereby said apparatus is usable either in the case of pulsed light signals of relatively short emission time such as those obtained on the moving body by means of a discharge lamp triggered by the unit synchronizing the motion picture cameras, or in the case of pulsed light signals of relatively long emission time such as those obtained by using flares on the moving body and furnished by the engine exhaust of said moving body.

4. Apparatus for recording the trajectories of moving bodies and aerial missiles emitting pulsed signals that sensitize photographic emulsions, said apparatus being of the type having a plurality of synchronously running motion picture cameras with shutters controlled by photoelectric cells receiving the pulsed luminous beam from the moving body, respectively, and comprising, in combination, for each motion picture camera, a shutter constituted of an electronic image converter acting as an electronic shutter and having a fluorescent screen directed toward the motion picture camera and a photo-cathode directed toward the moving body, a filter which discriminates between the ambient light and the light of the pulsed luminous beam and which is connected to the photoelectric cell, an amplifier connecting said filter to said photo-cathode, whereby said photo-cathode is energized by the photoelectric cell, and a convergent lens interposed between said fluorescent screen and the motion picture camera, whereby said apparatus is usable either in the case of pulsed light signals of relatively short emission time such as those obtained on the moving body by means of a discharge lamp triggered by the unit synchronizing the motion picture cameras, or in pulsed light signals of relatively long emission time such as those obtained by using flares on the moving body and furnished by the engine exhaust of said moving body.

5. An apparatus as claimed in claim 4, wherein the natures of the sensitive coatings on the electronic image converter photo-cathode and on the photoelectric cell are determined as a function of the wavelength of the pulsed light beam, either in the visible or the invisible spectrum.

6. Apparatus for recording the trajectories of moving bodies and aerial missiles emitting pulsed signals that sensitize photographic emulsions, said apparatus being of the type having a plurality of synchronously running motion picture cameras and comprising, in combination, for each motion picture camera, an electronic image converter acting as an electronic shutter and having a fluorescent screen directed toward the motion picture camera and a photo-cathode directed toward the moving body, a photoelectric cell receiving the pulsed luminous beam from the moving body, a filter which discriminates between the ambient light and the light of said luminous beam and which is connected to said cell, an amplifier connecting said filter to said photo-cathode in order to energize the latter, and a convergent lens interposed between said fluorescent screen and the motion picture camera.

7. Apparatus for recording the trajectories of moving bodies and aerial missiles emitting pulsed signals that sensitize photographic emulsions, said apparatus being of the type having a plurality of synchronously running motion picture cameras and comprising, in combination, for each motion picture camera, an electronic image converter acting as an electronic shutter and having a fluorescent screen directed toward the motion picture camera and a photo-cathode directed toward the moving body, a convergent mirror receiving part of the pulsed light beam from the moving body, a photoelectric cell positioned at the focal point of said mirror, a filter discriminating between the ambient light and the light from said light beam and connected to said cell, an amplifier connecting said filter to said photo-cathode, and two convergent optical units one of which is disposed between said fluorescent screen and the motion picture camera and the other in front of said photo-cathode so that it receives another portion of said pulsed light beam.

8. Apparatus for recording the trajectories of moving bodies and aerial missiles emitting pulsed signals that sensitize photographic emulsions, said apparatus being of the type having a plurality of synchronously running motion picture cameras and comprising, in combination, for each motion picture camera, an electronic image converter acting as an electronic shutter and having a fluorescent screen directed toward the motion picture camera and a photo-cathode directed toward the moving body, a photoelectric cell, a convergent optical unit receiving the pulsed light beam from the moving body and disposed in front of said photo-cathode, a semi-transparent mirror inclined at 45° and disposed between said convergent optical unit and said photo-cathode to reflect part of the convergent light beam issuing from said optical unit onto said cell, a filter discriminating between the ambient light and the light from said light beam and connected to said cell, and an amplifier connecting said filter to said photo-cathode.

9. Apparatus for recording the trajectories of moving bodies and aerial missiles emitting pulsed signals that sensitize photographic emulsions, said apparatus being of the type having a plurality of synchronously running motion picture cameras and comprising, in combination, for each motion picture camera, a mechanical shutter, a convergent mirror receiving part of the pulsed light beam from the moving body, a photoelectric cell positioned at the focal point of said mirror, a filter discriminating between the ambient light and the light from said light beam and connected to said cell, and an amplifier connecting said filter to said mechanical shutter to control the same, whereby the opening of said mechanical shutter is controlled at the beginning of each pulsed signal and is limited to the duration of said signal so that said apparatus is usable in the case of pulsed light signals of relatively long emission time, such as those obtained by the use of flares and given off by the engine exhaust of the moving body.

10. Apparatus for recording the trajectories of moving bodies and aerial missiles emitting pulsed signals that sensitize photographic emulsions, said apparatus being of the type having a plurality of synchronously running motion picture cameras and comprising, in combination, for each motion picture camera, an electronic image converter acting as an electronic shutter and having a fluorescent screen directed toward the motion picture camera and a photo-cathode directed toward the moving body, a photoelectric cell receiving the pulsed luminous beam from the moving body, a filter which discriminates between the ambient light and the light of said luminous beam and which is connected to said cell, an amplifier connecting said filter to said photo-cathode in order to energize the latter, a convergent lens interposed between said fluorescent screen and the motion picture camera, and a time-basis recorder connected to said amplifier for recording the signal emitted by the photoelectric cell, whereby an accurate history of the trajectory of the moving body may be obtained on the ground.

References Cited by the Examiner
UNITED STATES PATENTS

| | | | |
|---|---|---|---|
| 1,782,860 | 11/30 | Reipert | 95—12.5 |
| 2,146,723 | 2/39 | Dunham et al. | 346—1 |
| 2,232,829 | 2/41 | Ross | 346—1 |
| 2,460,163 | 1/49 | Bowen | 95—36 |
| 2,485,119 | 10/49 | Steiner | 95—11.5 |
| 2,628,881 | 2/53 | Adams | 346—1 |
| 2,791,165 | 5/57 | Hoyt | 95—36 |
| 2,871,088 | 1/59 | Abell | 346—1 |
| 2,941,459 | 6/60 | Fairbanks et al. | 95—36 |
| 2,960,380 | 11/60 | Edgerton | 346—107 |

LEYLAND M. MARTIN, *Primary Examiner.*